United States Patent [19]

Roth

[11] Patent Number: 5,451,035
[45] Date of Patent: Sep. 19, 1995

[54] METALLURGICAL FURNACE FOR PRODUCTION OF LIQUID STEEL

[75] Inventor: Raoul Roth, Villeurbanne, France

[73] Assignee: Sollac (Societe anonyme), Puteaux, France

[21] Appl. No.: 239,973

[22] Filed: May 9, 1994

[30] Foreign Application Priority Data

May 27, 1993 [FR] France ............................... 93 06621

[51] Int. Cl.⁶ .................................................. C21C 5/42
[52] U.S. Cl. .................................................. 266/227
[58] Field of Search ................................. 266/227, 157

[56] References Cited

U.S. PATENT DOCUMENTS

| | | | |
|---|---|---|---|
| 2,997,288 | 8/1961 | Schwechheimer et al. | 266/157 |
| 3,614,082 | 10/1971 | Tsymbal | 266/227 |
| 4,444,378 | 4/1982 | Reese | 266/237 |
| 5,050,185 | 9/1991 | Bourge et al. | 373/104 |
| 5,279,639 | 1/1994 | Kemeny et al. | 75/309 |

FOREIGN PATENT DOCUMENTS

| | | |
|---|---|---|
| 160185 | 3/1985 | European Pat. Off. |
| 429978 | 6/1991 | European Pat. Off. |
| 2297916 | 8/1976 | France |
| 2634787 | 2/1990 | France |
| 2192446 | 1/1988 | United Kingdom |

OTHER PUBLICATIONS

Patent Abstracts of Japan JP 58073714 Apr. 1983.

*Primary Examiner*—Melvyn Andrews
*Attorney, Agent, or Firm*—Sixbey, Friedman, Leedom & Ferguson

[57] ABSTRACT

The invention relates to a furnace (1) for melting metal-bearing substances and/or production of liquid metal (4) of the type in which said metal (4) has above it a layer of slag (5) liable to be affected by a "foaming" phenomenon, in which a side wall of said furnace comprises an orifice (17) opening into an adjacent tank (22) capped with a vault (25), said tank (22) being capable of collecting a proportion of said slag (5) by overflowing through said orifice (17) when said foaming phenomenon takes on proportions that risk causing damage to said furnace (1).

The invention also relates to a process for the production of liquid metal employing such a furnace.

7 Claims, 1 Drawing Sheet

METALLURGICAL FURNACE FOR PRODUCTION OF LIQUID STEEL

FIELD OF THE INVENTION

The invention relates to the field of metallurgical furnaces, especially arc furnaces, in which the melting of metallic or metal-bearing substances and the refining and the reheating of the bath of liquid metal thus obtained are performed. It also relates to the furnaces known as ladle furnaces, in which only the reheating and the adjustment of the composition of a bath of liquid metal are performed the melting having previously been carried out in another metallurgical reactor. It applies especially to iron and steel manufacture.

PRIOR ART

The so-called "foaming slag" technique is employed increasingly frequently in the production of steel in an electrical arc furnace. It consists in continuously forming, within the slag which floats on the liquid bath, numerous small bubbles of gas which considerably increase the volume of the slag. This can be done by adding to the slag carbon which, by reacting with the most reducible oxides in the slag, forms bubbles of CO. A decarburizing of the liquid steel bath can also be exploited: the large bubbles of CO entrain a film of liquid metal with them as they pass through the slag. At the slag-atmosphere interface the bubbles burst and the metal returns into the slag in the form of fine droplets. The carbon which they contain reacts with the reducible oxides and forms small bubbles of CO which maintain the foaming. This decarburizing of the bath may be merely a natural consequence of its composition when it has a high carbon content and is in contact with a source of oxygen (surrounding air, slag oxides). It can also be caused or accentuated by a deliberate injection of oxygen within the liquid bath by means of a lance immersed in the bath and/or of tuyeres incorporated in the hearth of the furnace.

In an alternating or direct current electrical melting furnace the liquid steel is formed from scrap iron or from prereduced iron ore or from a mixture of such materials. A foaming slag is sought after therein in order to allow the complete immersion of the electrical arc by virtue of which the reheating energy is imparted to the liquid bath. A satisfactory efficiency is thus obtained for the heat transfer between the electrical arc produced by the graphite electrode(s) and the metal, together with a lower wear of the furnace walls by the radiation of the arc, and also a lower wear of the electrodes, since it is thus possible to maintain an electrical arc of great length.

However, the foaming of the slag must be carefully controlled so that it does not reach exaggerated proportions. This is particularly the case in the electrical furnaces of modern design, which are known as "airtight arc furnaces". In these arc furnaces an attempt is made to limit the entries of external air as much as possible in order to have better control of the composition of the atmosphere inside the furnace, the composition and the flow rate of the gases which escape from it and the change in the bath composition. Excessive foaming of the slag runs the risk of bringing the latter up to the level of the components which ensure the sealing between the side wall and the vault of the furnace, and of destroying these components. This risk is particularly great when it is desired to produce liquid steel from iron-bearing substances consisting of prereduced iron ores mixed with large quantities of carbonaceous substances. After melting of the substances, such a production results in the formation of a pig iron or of a semi-pig iron containing, for example, 4 to 5% of carbon which will next need to be decarburized by massive injection of oxygen, unavoidably resulting in an intense foaming of the slag.

On the other hand, in steel plant ladle furnaces where the melting of iron-bearing substances is not carried out but only the reheating and the adjustment of the composition of the liquid steel, foaming of the slag is not sought after. Such foaming can, nevertheless, be produced accidentally when the ladle furnace operates at reduced pressure. If the slag then rises as far as the seals responsible for the sealing between the ladle and its vault, it destroys them and the plant becomes unusable.

SUMMARY OF THE INVENTION

The aim of the invention is to propose a metallurgical furnace for melting and/or reheating metal, the design of which allows a considerable foaming of the slag in complete safety, irrespective of whether this foaming is accidental or deliberately sought after.

To this end, the subject of the invention is a furnace for melting metal-bearing substances and/or production of liquid metal, of the the in which said metal has above it a layer of slag liable of being affected by a "foaming" phenomenon, in which a side wall of said furnace comprises an orifice opening into an adjacent tank capped by a vault, said tank being capable of collecting a proportion of said slag through said orifice when said foaming phenomenon takes on proportions that risk causing damage to said furnace.

The invention also relates to a process for the production of liquid metal employing such a furnace.

As will have been understood, the invention consists in adjoining to a conventional metallurgical furnace a receiver tank connected to the side wall of the furnace and into which the slag can overflow in the event of excessive foaming, before it reaches the upper part of the furnace wall which is connected to the vault.

BRIEF DESCRIPTION OF THE DRAWINGS

The invention will be better understood on reading the description which follows and which refers to the following figures:

FIGS. 1 and 2 show an electrical steel plant furnace 1 conventionally made up of the following components. The lower part consists of a metal body 2 lined internally with a refractory lining 3, defining a vessel intended to contain the liquid steel 4 and the slag 5 which is above it. The side wall of the furnace is supplemented by a series of metal panels 6, 6' cooled internally by water circulation and secured to the upper edge of the body 2. The furnace is capped by a metal vault 7, also cooled by water circulation, and resting on the upper periphery of the panels 6, 6'. This vault is pierced with three holes 8, 8', 8" allowing to pass three graphite electrodes 9, 9', 9" which are connected to a source of alternating current, not shown, and carried by supports, also not shown. These supports make it possible to vary the distances of the ends of the electrodes in relation to the surface 10 of the liquid metal. The furnace 1 is also provided with means for blowing oxygen into the metal bath 4, which enable it to be decarburized and a forming slag to be obtained. In FIG. 1 such means are shown in the form of three tuyeres 11, 11' 11" which pass through the body 2 and the refractory lining 3 in the bottom of the furnace, and of a lance 11"' which passes through the vault 7 and whose end is or is not immersed in the liquid bath.

Figure 1:
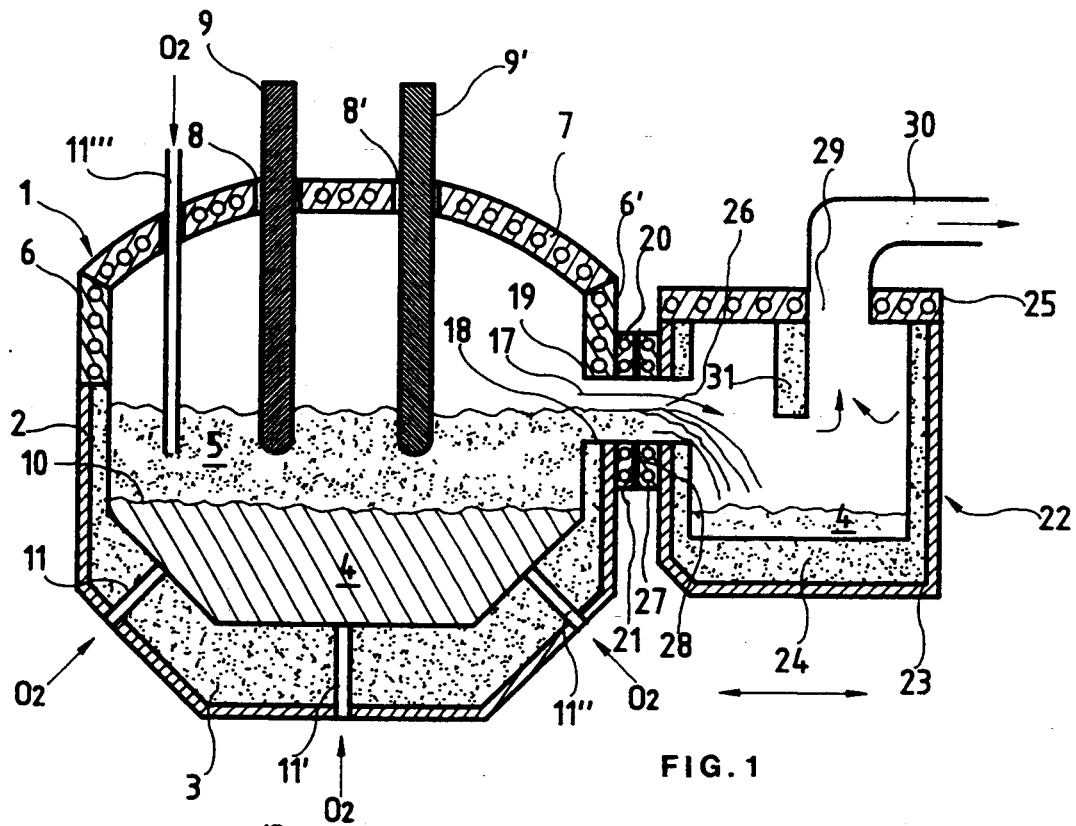
FIG. 1, which shows diagrammatically an example of a steel plant electrical furnace with three electrodes according to the invention, seen in section along the line I—I of FIG. 2.
Figure 2:
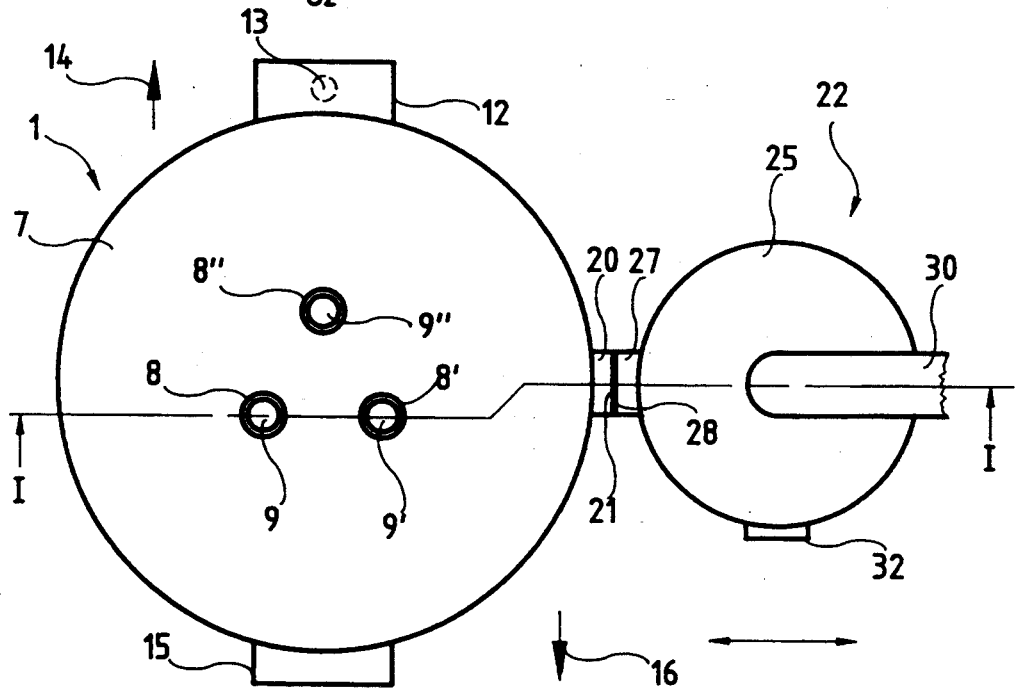
FIG. 2, which shows diagrammatically this same furnace seen from above.

The tank of the furnace 1 also comprises a casting compartment 12 whose bottom is pierced with a tap hole 13 normally shut off by a device which is not shown, such as a slide valve or nozzle. At the time of casting, the furnace 1, which is mounted, for example, on a tilting cradle, is tilted according to the arrow 14 so as to send the liquid steel 4 gradually into the casting compartment 12, the hole 13 of which is then open. The liquid steel 4 can then flow out of the furnace 11 and be collected in a ladle.

Opposite the casting compartment 12, the furnace 1 is also equipped with a door for slag removal 15. When opened, this allows the operators to have access to the surface 10 of the bath of liquid steel 4 and to take off, if necessary, the layer of slag 5 in order to replace it with a slag with more favorable metallurgical properties. For this purpose the furnace 1 can be tilted according to the arrow 16, that is to say in the direction opposite to the tilting direction 14 permitting the casting.

The furnace 1 is also equipped with conventional devices, not shown, permitting the introduction of solid alloy components into the liquid bath 4, or of gases other than oxygen.

According to the invention the furnace 1 comprises, in the top part of its side wall, an orifice 17 of some section or other, for example approximately circular or rectangular. This orifice 17 is preferably fitted so that its axis forms a right angle with the direction along which the furnace 1 can tilt during a casting or slag removal operation. In the example shown, the lower edge 18 of the orifice 17 is situated in the region of the side wall of the furnace 1 which consists of the metal body 2 lined with refractory 3. The upper edge 19 of the orifice 17 is situated in the region where the wall of the furnace 1 consists of the cold panel 6'. This orifice 17 has its lower edge 18 placed so that it forms an overflow weir for the slag 5 when the latter reaches the maximum permissible level while foaming. This level is that above which, if the foaming increases, there is a risk of damage to the upper part of the furnace (cold panels 6, 6' and seals between the cold panels 6, 6' and the vault 7). The orifice 17 thus allows the slag 5, merely by overflowing, to be discharged naturally from the furnace 1 without requiring the stopping of the foaming operation and action by the operators responsible for running the furnace 1. On the outer wall of the furnace 1 the orifice 17 is edged over its whole periphery by a component 20 whose outer face defines a door 21. When the furnace 1 is in use, this component 20 must be as undeformable as possible despite the intense heat of its surroundings; it may be made, for example, of a metallic material and cooled by internal water circulation as shown.

Still according to the invention, the plant also comprises a tank 22 intended to receive the slag 5 when a proportion of the latter escapes from the furnace through the orifice 17. This tank may consist, as shown, of a metal pot 23 internally lined with a refractory 24 and of an internally cooled metal vault 25 secured to the pot 23 or resting on it in a manner that is as leakproof as possible. In the upper part of its side wall this tank 2 comprises an orifice 26 whose geometry is identical with that of the orifice 17 of the furnace. On the outer wall of the tank 22 the orifice 26 is edged over its whole periphery by a component 27 (for example made of an internally cooled metallic material) whose outer face defines a bearing surface 28 corresponding to the bearing surface 21 of the component 20 which surrounds the orifice 17 arranged in the side wall of the furnace 1. When placed in contact with one another, these two bearing surfaces 21 and 27 must be capable of being laid against each other with leakproofing that is as good as possible.

The vault 25 of the tank 22 also comprises an orifice 29 to which is connected a conduit 30 joined to a plant, not shown, for drawing out, and removing dust from, the gases. This conduit 30 makes it possible to remove from the plant the gases that are given off when the steel is being produced. As shown here, it replaces or is added to the conduit for an identical purpose, which is connected to the furnace vault in conventional steel plant furnaces.

The tank 22 is fitted in a cradle, not shown, which allows the tank 22 to be brought near the furnace 1 until the two bearing surfaces 21 and 28 are placed in contact with one another before the beginning of the production, and to move the tank 22 and the furnace 1 apart after the end of the production. The two cradles can also be integrally attached to each other so that when the furnace 1 is tilted for a casting or a slag removal operation, the tank 22 can accompany its movement without it being necessary to break the contact between the bearing surfaces 21 and 28. However, if it is considered permissible to break this contact, and therefore the sealing of the plant, during the periods when the furnace 1 is tilted if the latter are short enough, this possibility of simultaneous tilting of the two cradles may be dispensed with.

It may also be desirable to instal, in the vicinity of the gas outlet orifice 29 of the tank 22, barriers 31 which impede the travel of said gases while making them lose a proportion of their energy. The quantity of dust carried by these gases out of the plant can thus be limited by increasing the deposition of this dust inside the tank 22. It then joins therein the fraction of the slag 5 which may have overflowed from the furnace 1 during the production of the liquid steel 4.

After this production and the casting out of the furnace 1 of the liquid metal 4 which has resulted therefrom, the tank 22 is moved away from the furnace 1 and may, if necessary, be emptied, for example by tilting or scraping. A door 32 may be provided for this purpose on the side wall of the tank 22, comparable with the slag removal door 15 of the furnace 1.

Deposits of dust or of slag must be prevented from giving rise to an excessive fouling of the orifices 17 and 26, which could disturb particularly the optimum operation of the plant for removing the gases. It is preferable for this purpose that the section of this orifice should be larger than that of the orifice 29 in the vault 25 of the tank 21, to which this removal plant is connected.

It is generally advantageous to take particular care over the sealing of the tank 22 and of its connection to the furnace 1 with regard to the external atmosphere. The aim is thus to preserve an excellent control of the composition of the atmosphere above the liquid bath and of the gases which are sent to the gas-collecting and dust precipitation plant. If need be, means may be provided for rigidly securing the bearing surfaces 21 and 28 against each other while the furnace is in operation.

By way of example, provision may be made for the internal volume of the tank 22 to be approximately 16 m³ (4 m in length, 2 m in width, 2 m in height) if it is used in combination with a furnace 1 with a capacity of 100 t of steel.

In an alternative form, no provision may be made for a gas exhausting plant 29, 30 connected to the tank 22 and it may be connected only to the vault 7 of the furnace 1, as is done in conventional furnaces. However, this would lose the advantages of the configuration exemplified, namely a greater possibility of natural removal of dust from the gases in the tank 22, and also a better absorption by the trapping plant of abrupt increases in the gas flow rate as a result of the large volume provided between the metal bath 4 and the gas collection orifice 29.

It is also possible to provide not one but a plurality of orifices arranged in the side wall of the furnace 1 and opening into the tank 22.

The invention applies to all types of metallurgical furnaces intended for melting metal-bearing materials and/or producing liquid metal, in which foaming of the slag is sought deliberately or runs the risk of being experienced involuntarily. It applies very particularly to alternating or direct current electrical steel plant furnaces, above all if they are called upon to ensure the conversion into steel of a bath of liquid metal which is initially very rich in carbon. It also applies to steel plant ladle furnaces in which sudden foaming of the slag can take place during a vacuum treatment, it being possible for these ladle furnaces to be equally well electrical arc ladle furnaces and electromagnetic induction ladle furnaces.

What is claimed is:

1. A furnace for melting metal-bearing substances and/or for the production of liquid metal in which a layer of foaming slag may be present above the level of the liquid metal, comprising:

a furnace having a side wall, and a casting opening for admitting said liquid metal bath out of said furnace, and means for preventing foaming slag from rising to a level that would damage the furnace, including an orifice in said furnace side wall that is separate from said casting opening for directing a flow of said foaming slag outside of said furnace, and a tank means for collecting said flow of foaming slag.

2. The furnace as claimed in claim 1, wherein said tank means includes a vault, and said vault is connected to a conduit for directing gases present in the furnace towards a plant for collecting and removing dust from said gases.

3. The furnace as claimed in claim 1 in which said: furnace consists of a steel plant electrical arc furnace.

4. The furnace as claimed in claim 3; wherein said liquid metal results from the melting of iron-bearing substances mixed with carbonaceous substances, and which further comprises means for carrying out a decarburizing of said liquid metal.

5. The furnace as claimed in claim 1 in which said furnace consists of a steel plant ladle.

6. The furnace as claimed in claim 1, wherein said orifice allows foaming slag to overflow out of said furnace before said foaming slag contacts a region of said furnace located above said orifice that would be damaged by contact with such slag.

7. The furnace as claimed in claim 6 further comprising a vessel for holding said metal bath and slag, a furnace vault for covering said vessel, panels between said vessel and said vault, and air seals between said panels and said furnace vault, wherein said orifice of said damage prevention means is in a wall of said vessel below said panels for preventing foaming slag from contacting said panels, air seals, and furnace vault.

* * * * *